United States Patent
Katsu

(10) Patent No.: US 10,886,043 B2
(45) Date of Patent: Jan. 5, 2021

(54) CERAMIC MEMBER

(71) Applicant: Murata Manufacturing Co., Ltd., Nagaokakyo (JP)

(72) Inventor: Hayato Katsu, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/878,949

(22) Filed: May 20, 2020

(65) Prior Publication Data

US 2020/0286654 A1 Sep. 10, 2020

Related U.S. Application Data

(63) Continuation of application No. PCT/JP2018/038665, filed on Oct. 17, 2018.

(30) Foreign Application Priority Data

Nov. 29, 2017 (JP) .................... 2017-228878

(51) Int. Cl.
*H01C 7/04* (2006.01)
*C01G 45/12* (2006.01)
*H01C 7/13* (2006.01)

(52) U.S. Cl.
CPC ......... *H01C 7/043* (2013.01); *C01G 45/1264* (2013.01); *H01C 7/13* (2013.01); *C01P 2002/52* (2013.01); *C01P 2002/72* (2013.01); *C01P 2002/76* (2013.01)

(58) Field of Classification Search
CPC ....... H01C 7/043; H01C 7/13; C01G 45/1264
See application file for complete search history.

(56) References Cited

U.S. PATENT DOCUMENTS

| 8,466,771 | B2 * | 6/2013 | Fujita ............... C04B 35/016 338/22 SD |
| 8,981,893 | B2 | 3/2015 | Hirose |
| 10,364,161 | B2 | 7/2019 | Hirose et al. |
| 2009/0016409 | A1 * | 1/2009 | Mizoguchi ............ G01K 1/08 374/185 |
| 2010/0134237 | A1 * | 6/2010 | Miura ................. H01C 7/008 338/22 R |
| 2011/0027587 | A1 * | 2/2011 | Poulain ............... H01C 7/045 428/402 |

(Continued)

FOREIGN PATENT DOCUMENTS

| JP | S5911602 A | 1/1984 |
| JP | H04149023 A | 5/1992 |

(Continued)

OTHER PUBLICATIONS

Written Opinion of the International Searching Authority issued for PCT/JP2018/038665, dated Dec. 4, 2018.

(Continued)

*Primary Examiner* — Kyung S Lee
(74) *Attorney, Agent, or Firm* — Arent Fox LLP

(57) ABSTRACT

A ceramic member comprising a compound oxide of La, E and Mn, wherein AE is (i) Ca, or (ii) contains Ca and at least one of Sr and Ba with a total amount of Sr and Ba to a total of Ca, Sr and Ba of not more than 5 mol %, and a crystal system in a surface of the ceramic member is a monoclinic system.

20 Claims, 1 Drawing Sheet

(56) References Cited

U.S. PATENT DOCUMENTS

2011/0273265 A1* 11/2011 Fujita ............... C04B 35/63416
338/22 SD
2013/0221475 A1   8/2013 Hirose
2019/0077677 A1   3/2019 Hirose et al.

FOREIGN PATENT DOCUMENTS

| JP | 2000138103 A | 5/2000 |
| JP | 2003007508 A | 1/2003 |
| WO | 2012056797 A1 | 5/2012 |
| WO | 2017204118 A1 | 11/2017 |

OTHER PUBLICATIONS

International Search Report issued for PCT/JP2018/038665, dated Dec. 4, 2018.
Jae-Hong Song et al.; "La—Ca—Mn—O Thin Film based on Thermistor for Measuring Low Temperature of 77-230 K"; Jpn. J. Appl Phys., vol. 39, Part 1, No. 8, Aug. 2000, pp. 4993-4997.
S. Kh. Estemirova et al.; "Magnetic and Structural Inhomogeneities of the $La_{1-x}Ca_xMnO_{3+\delta}$ Manganites"; Glass Physics and Chemistry, 2007, vol. 33, No. 4, pp. 356-361.

\* cited by examiner

CERAMIC MEMBER

CROSS REFERENCE TO RELATED APPLICATIONS

The present application is a continuation of International application No. PCT/JP2018/038665, filed Oct. 17, 2018, which claims priority to Japanese Patent Application No. 2017-228878, filed Nov. 29, 2017, the entire contents of each of which are incorporated herein by reference.

FIELD OF THE INVENTION

The present invention relates to a ceramic member and a production method for the ceramic member.

BACKGROUND OF THE INVENTION

Recently, many modules and motors handling large currents have been used in electric cars and hybrid cars. In those modules and so on, an inrush current generates when a power supply is turned on (or when a motor is started up). If the excessive inrush current flows through the module, for example, there is a possibility of damaging electronic components, ICs, etc. inside the module. Using a thermistor element as an inrush current suppression element is being studied as a way to address such a problem.

In the case of using the thermistor element, because the inrush current generated at the startup of a motor in an electric car reaches several hundreds of amperes (A), high resistance to the inrush current is demanded. Moreover, because the thermistor element needs to be operated at relatively high temperature of 120 to 250° C., for example, high reliability is also demanded. In addition, when the resistance of the element itself is high, enough power cannot be transferred to the motor, thus causing a battery to drain. From that point of view, the resistance of the element itself needs to be reduced. It is therefore preferable to use, as a thermistor material, a material with low resistance and properties of abruptly reducing its resistance near 100 to 150° C. (namely, a material having a high B-constant).

Up to now, a NTC (Negative Temperature Coefficient) thermistor is known as the inrush current suppression thermistor element. However, the NTC thermistor is disadvantageous in the following point. In the NTC thermistor with a low resistivity, a resistance change between a low temperature state and a high temperature state is not sufficiently large (namely, the B-constant is low), and the power loss caused by residual resistance during a period in which a steady current flows (namely, in an on-state or in the high temperature state) is relatively large. On the other hand, the NTC thermistor in which the resistance change between the low temperature state and the high temperature state (namely, the B-constant) is sufficiently large has the problem that the resistivity is high and an element size has to be increased to reduce the element resistance. Those problems are attributable to a general correlation between the resistivity and the B-constant of a conductive material. In other words, because the B-constant reduces as the resistivity reduces, it is difficult to realize the low resistivity and the high B-constant at the same time.

In consideration of the above point, using a CTR (Critical Temperature Resistor) as the thermistor element for suppressing the inrush current is under study. The CTR has characteristics exhibiting a sharp resistance fall at a certain temperature or in a certain temperature range (hereinafter simply called "CTR characteristics") and hence has the much higher B-constant than the NTC thermistor in which the resistance gradually reduces with a temperature rise.

As an example of ceramic materials having the CTR characteristics, a ceramic material is proposed which has a structure represented by a chemical formula $R1_{1-x}R2_xBaMn_2O_6$ and which satisfies the following conditions;

(1) when R1 is Nd and R2 is at least one among Sm, Eu and Gd, x is $0.05 \leq x \leq 1.0$, (2) when R1 is Nd and R2 is at least one among Tb, Dy, Ho, Er and Y, x is $0.05 \leq x \leq 0.8$, (3) when R1 is at least one among Sm, Eu and Gd and R2 is at least one among Tb, Dy, Ho and Y, x is $0 \leq x \leq 0.4$, and (4) when R1 is at least one among Sm, Eu and Gd and R2 is at least a remaining one that is not selected as R1 from among Sm, Eu and Gd, x is $0 \leq x \leq 1.0$ (Patent Document 1).

The ceramic material disclosed in Patent Document 1 is an A-site aligned Mn compound in which a rare earth element and barium both coming into the A-site of a perovskite structure are aligned with each other, and it exhibits the CTR characteristics. Patent Document 1 states that this ceramic material exhibits a sharp resistance change near 100° C. as illustrated, by way of example, in FIG. 2 of Patent Document 1 and is suitable to form the thermistor element for suppressing the inrush current.

Patent Document 1: International Publication No. 2012/056797

SUMMARY OF THE INVENTION

As a result of studying the ceramic material disclosed in Patent Document 1, the inventor has confirmed that the disclosed ceramic material certainly has low resistance and exhibits a sharp resistance change, but has found that the resistance of the ceramic material increases with a heat cycle test and a high temperature exposure test. In consideration of the above point, the inventor has focused attention on a compound oxide of La, AE (AE denotes at least one among Ca, Sr and Ba), and Mn with intent to obtain a ceramic material that have a low resistivity and a high B-constant and that can realize higher resistance to both heat cycles and high temperatures (namely, higher reliability).

In addition, as a result of further conducting studies, the inventor has found the following problem. Although good electrical characteristics, particularly good IV (current-voltage) characteristics, are demanded in the thermistor element, the IV characteristics degrade when the above-mentioned compound oxide is used to fabricate the thermistor element by a general production method.

The inventor has discovered that the IV characteristics can be improved by annealing a ceramic member that is made of a compound oxide of La, AE (AE denotes Ca or contains Ca and at least one among Sr and Ba) and Mn.

According to a first aspect of the present disclosure, there is provided a ceramic member made of a compound oxide of La, AE and Mn, wherein: AE is (i) Ca, or (ii) contains Ca and at least one of Sr and Ba with a total amount of Sr and Ba to a total of Ca, Sr and Ba being not more than 5 mol %, and a crystal system in a surface of the ceramic member is a monoclinic system.

According to a second aspect of the present disclosure, there is provided a ceramic member made of a compound oxide of La, AE and Mn, wherein: AE is (i) Ca, or (ii) contains Ca and at least one of Sr and Ba with a total amount of Sr and Ba to a total of Ca, Sr and Ba being not more than 5 mol %, and the ceramic member has peaks at $2\theta=32.5°$ and $32.7°$ in an X-ray diffraction analysis using a CuK α-ray source.

According to a third aspect of the present disclosure, there is provided an electronic element including a bare body made of either of the above-described ceramic members and an electrode formed on a surface of the bare body.

According to a fourth aspect of the present disclosure, there is provided a production method for a ceramic member made of a compound oxide of La, AE and Mn, the production method comprising: obtaining a sintered body by firing a La source, an AE source (where AE is (i) Ca, or (ii) contains Ca and at least one of Sr and Ba with a total amount of Sr and Ba to a total of Ca, Sr and Ba being not more than 5 mol %), and a Mn source; removing at least a part of a surface of the sintered body; and annealing the sintered body from which at least the part of the surface has been removed at 900° C. or higher under the presence of oxygen.

According to the present disclosure, the ceramic member having good electrical characteristics can be obtained by annealing a member that is made of the compound oxide of La, AE (AE denotes Ca or contains Ca and at least one among Sr and Ba) and Mn.

DETAILED DESCRIPTION OF THE PREFERRED EMBODIMENTS

Figure 1:
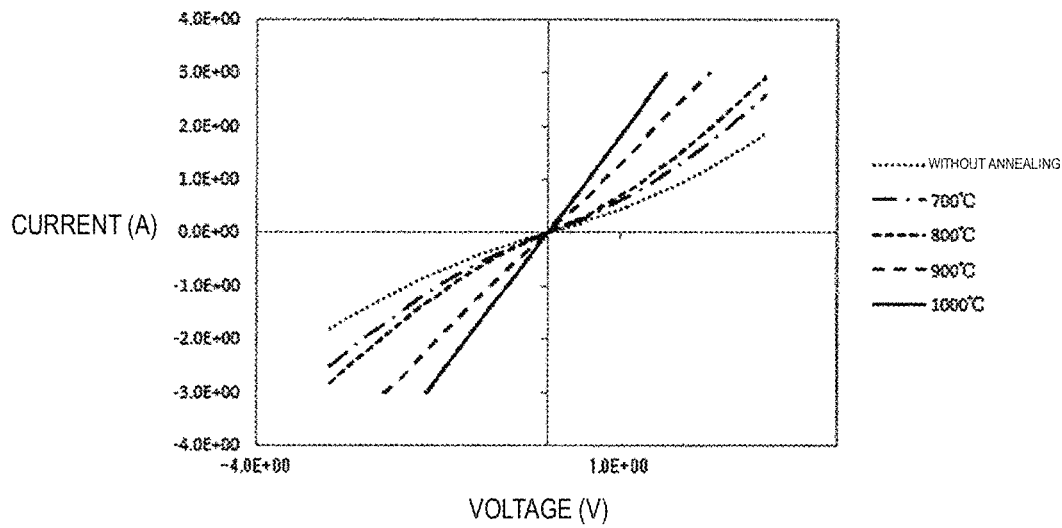
FIG. 1 plots IV characteristics of samples according to EXAMPLE.

A ceramic member according to the present invention and an electronic element using the ceramic member will be described in detail below.

The ceramic member according to the present invention is made of a ceramic material that can be understood as a compound oxide of La, AE and Mn. Here, AE is (i) Ca or (ii) Ca and at least one selected from Sr and Ba with a total amount of Sr and Ba to a total of Ca, Sr and Ba being not more than 5 mol %. The composition of the compound oxide can be identified by a known method in the relevant technical field. For example, inductively coupled plasma atomic emission spectrometry (ICP-AES), inductively coupled plasma mass spectrometry (ICP-MS), or an X-ray fluorescence (XRF) analyzer can be used to identify the compound oxide.

In an embodiment, the above-described ceramic material is a compound oxide having a composition expressed by a formula (I) given below:

$La_{1-x-y}AE_yMnO_3$

In the formula:
AE is (i) Ca, or (ii) contains Ca and at least one of Sr and Ba with a total amount of Sr and Ba to a total of Ca, Sr and Ba being not more than 5 mol %,
x is 0<x≤0.20, and
y is 0<y≤0.10.

In a preferred embodiment, in the above formula (I), x is 0<x<0.20, and y is 0.03<y<0.10.

Since the compound oxide has the above-mentioned composition, the ceramic member according to the present disclosure has a lower resistivity, exhibits a sharper resistance change with a temperature rise, and further has a higher B-constant and higher reliability (heat-cycle resistance).

In the above formula (I) expressing the composition of the compound oxide, an oxygen amount is specified as 3, but the oxygen amount may be non-stoichiometric. Stated in another way, in the above formula, the oxygen amount may be a little more or less than 3 depending on the type of AE or values of x and y. The present invention can accommodate such a variation in the oxygen amount.

In another embodiment, the above-described ceramic material is a compound oxide made of La, AE and Mn, wherein:

AE is (i) Ca, or (ii) contains Ca and at least one of Sr and Ba with a total amount of Sr and Ba to a total of Ca, Sr and Ba being not more than 5 mol %, a total of molar parts of the contained La and molar parts of the contained AE is 80 to less than 100 molar parts with respect to 100 molar parts of Mn, and the molar parts of the contained AE are more than 0 molar part to not more than 10 molar parts with respect to 100 molar parts of Mn.

In a preferred embodiment, the total of molar parts of the contained La and molar parts of the contained AE is 80 to less than 100 molar parts with respect to 100 molar parts of Mn, and molar parts of the contained AE is more than 3 molar parts and less than 10 molar parts with respect to 100 molar parts of Mn.

Since the compound oxide has the above-mentioned composition, the ceramic member according to the present disclosure has a lower resistivity, exhibits a sharper resistance change with a temperature rise, and further has a higher B-constant and higher reliability (heat-cycle resistance).

In the above-described embodiments, when AE is made of Ca and at least one of Sr and Ba, the total amount of Sr and Ba to the total of Ca, Sr and Ba may be preferably not more than 3 mol % and more preferably not more than 1 mol %, for example, not more than 0.5 mol %. A lower limit of the total amount of Sr and Ba is not limited to a particular value, and it may be, for example, not less than 0.01 mol % or not less than 0.1 mol %. AE is preferably Ca.

The above-described ceramic material has a resistivity reducing with a temperature rise.

The above-described ceramic material has a small resistivity particularly at a room temperature. In more detail, the resistivity of the ceramic material at 25° C. is, for example, not more than 10 Ω·cm, preferably not more than 5 Ω·cm, more preferably not more than 2 Ω·cm, and even more preferably not more than 1 Ω·cm. By so setting the resistivity, a degree of freedom in design of an element size (shape) is increased and the element can be fabricated relatively easily. It is also possible to improve a response to an inrush current and to effectively suppress the inrush current.

The above-described ceramic material exhibits a large resistance change in accordance with a temperature change as mentioned above. The magnitude of the resistance change in accordance with the temperature change can be evaluated by using, as an index, a B-constant calculated from the following formula:

$$B\text{-constant}=\ln(R_1/R_2)/(1/T_1-1/T_2) \quad (1)$$

where $R_1$ and $R_2$ denote, respectively, resistance values (Ω) at temperatures $T_1$ and $T_2$ (K).

In the above-described ceramic material, the B-constant between 25° C. and 100° C., namely the B-constant obtained by measuring a resistance value at intervals of 5° C. and calculating the B-constant based on the above formula on condition of $T_2$=100° C. and $T_1$=25° C., is, for example, not less than 1500K, preferably not less than 2000K, and more preferably not less than 2400K. By so setting the B-constant, it is possible to effectively suppress the inrush current and to effectively reduce the power loss caused by residual resistance during a period in which a steady current flows (namely, in an on-state). Hereinafter, the term "B-constant" used herein denotes the B-constant calculated based on the formula (1) on condition of $T_1=25°$ C. (298K) and $T_2=100°$ C. (373K).

In a preferred embodiment, the above-described ceramic material has the resistivity of not more than 5 Ω·cm and the B-constant of not less than 1500K, preferably the resistivity of not more than 2 Ω·cm and the B-constant of not less than 2000K. More preferably, when the resistivity is more than 1 Ω·cm and not more than 2 Ω·cm, the ceramic material has the B-constant of not less than 2400K, and when the resistivity is not more than 1 Ω·cm, the ceramic material has the B-constant of not less than 2000K.

The above-described ceramic material can effectively prevent the resistance change between before and after a heat cycle test, exhibits high heat-cycle resistance, and can realize high reliability. In more detail, even when the ceramic material is subjected to the heat cycle test in a temperature range of −25° C. to 240° C., for example, a resistance change rate between before and after the test can be held at 10% or below. Furthermore, the ceramic material can realize high resistance to a high temperature exposure test at 250° C.

The above-described ceramic material can be produced by appropriately combining various methods known in the technical field of the compound oxide.

As an example, the ceramic material can be produced as follows. After preparing materials each containing calcium, strontium, or barium and oxygen (e.g., an oxide, a carbonate, a hydroxide, and so on; this is similarly applied to other materials given below) as AE sources (namely, a Ca source, a Sr source, and/or a Ba source), a material containing lanthanum and oxygen as a La source, and a material containing manganese and oxygen as a Mn source, those prepared materials are weighed at a desired ratio and are then mixed and fired (together with a binder and so on as required).

The ceramic member according to the present disclosure is made of the above-described ceramic material.

In an embodiment, a crystal system in a surface of the ceramic member according to the present disclosure is a monoclinic system. With the surface of the ceramic material having a crystal structure of the monoclinic system, when an electrode is formed on that surface, an ohmic junction can be formed at the interface between the ceramic member and the electrode. Hence electrical characteristics are improved.

The crystal system in the surface of the ceramic member can be checked by an X-ray diffraction analysis.

Here, the "surface" of the ceramic member stands for a surface layer with a depth through which at least an X-ray using a CuK α-ray source can penetrate, and it includes a region up to 10 μm, for example, from an outermost surface.

In another embodiment, when the surface of the ceramic member is analyzed by the X-ray diffraction analysis using the CuK α-ray source, the ceramic member according to the present disclosure has peaks at 2θ=32.5° and 32.7°.

The X-ray diffraction analysis can be performed by using RINT-K (made by Rigaku Corporation).

In a preferred embodiment, a ratio (I2/I1) of peak intensity at 2θ=32.7° (hereinafter also called "I2") to peak intensity at 2θ=32.5° (hereinafter also called "I1") is larger than 1.00. I2/I1 is preferably not less than 1.40 and more preferably not less than 2.00.

In an embodiment, the crystal system of the above-described ceramic member is different between the surface and a middle portion of the ceramic member.

In a preferred embodiment, the crystal system in the surface of the above-described ceramic member is a monoclinic system, and the crystal system in the middle portion thereof is an orthorhombic system. Here, the expressions "the crystal system in the surface is a monoclinic system" and "the crystal system in the middle portion is an orthorhombic system" do not imply that the crystal system in the relevant region is a perfect monoclinic system or a perfect orthorhombic system, and imply that the crystal system is mainly the monoclinic system or the orthorhombic system. For example, the term "monoclinic system" and "orthorhombic system" is used on condition that 55% or higher, preferably 70% or higher, more preferably 90% or higher, even more preferably 95% or higher, and still even more preferably almost all, e.g., 99.0% or higher or 99.5% or higher, of crystals in the relevant region have the predetermined crystal system.

Here, the "middle portion" of the ceramic member stands for a portion that is present at a distance of not shorter than 100 μm and preferably of not shorter than 300 μm inward from the outermost surface of the ceramic member. Typically, the "middle portion" may be a portion near the center of gravity of the ceramic member.

The shape of the ceramic member according to the present disclosure is not limited to particular one, and it may have any shape suitable for the electronic element, such as a rectangular parallelepiped shape, a disk-like shape, or a plate-like shape.

The ceramic member according to the present disclosure can be used as a member for an electronic element. In particular, since the ceramic member according to the present disclosure exhibits the NTC (Negative Temperature Coefficient) characteristics, it is suitably used, for example, as a bare body of a member for a thermistor element.

Accordingly, the present disclosure discloses the ceramic member used as a bare body of an electronic component. Furthermore, the present disclosure discloses an electronic element including the bare body according to the present disclosure and an electrode formed on a surface of the bare body. Preferably, the present disclosure discloses an electronic element including the bare body according to the present disclosure and at least two electrodes formed in a sandwiching relation to at least part of the bare body.

In an embodiment, the electrode of the electronic element according to the present disclosure is preferably disposed in a portion of the surface of the bare body, the portion having the crystal structure of the monoclinic system.

In an embodiment, the electrode of the electronic element according to the present disclosure is preferably disposed in a portion of the surface of the bare body, the portion exhibiting the peaks at 2θ=32.5° and 32.7°.

In a preferred embodiment, the electrode of the electronic element according to the present disclosure is preferably disposed in a portion of the surface of the bare body where the ratio of the peak intensity at 2θ=32.7° to the peak intensity at 2θ=32.5° is larger than 1.

By disposing the electrode, as described above, in the portion having the crystal structure of the monoclinic system, or the portion having the peaks at 2θ=32.5° and 32.7°, or the portion where the ratio of the peak intensity at 2θ=32.7° to the peak intensity at 2θ=32.5° is larger than 1, an ohmic junction can be formed at the interface between the electrode and the bare body, and hence electrical characteristics, for example, IV characteristics (current-voltage characteristics), are improved.

In an embodiment, the square of a correlation coefficient r of the IV characteristics in the electronic element according to the present disclosure is not less than 0.9993, preferably not less than 0.9995, more preferably not less than 0.9999, and even more preferably 1.0000.

Here, the correlation coefficient r of the IV characteristics can be determined from the following formula on an assumption that a voltage (V) is represented by an x-axis and a current (I) is presented by a y-axis.

$$r = \frac{S(xy)}{\sqrt{S(xx)S(yy)}}$$
$$s(xx) = \sum (x_i - \bar{x})^2$$
$$s(yy) = \sum (y_i - \bar{y})^2$$
$$s(xy) = \sum (x_i - \bar{x})(y_i - \bar{y})$$

Materials of the above-described electrode are not limited to particular ones, and the electrode is made of one or more metal materials selected from conductive materials, preferably Au, Ag, Pd, Ni, Cu and Sn. In a preferred embodiment, the suitable material is Ag. By using Ag, the ohmic junction at the interface between the electrode and the bare body can be formed in a more satisfactory state.

Because the electronic element according to the present disclosure has the low resistance and the good electrical characteristics, it can be suitably used as an inrush current suppression element.

A production method for the electronic element according to the present disclosure will be described below.

The electronic element according to the present disclosure can be fabricated by preparing, as a bare body, the ceramic member according to the present disclosure, and by forming an electrode on a surface of the bare member.

More specifically, the bare body formed of the ceramic member according to the present disclosure can be fabricated as follows.

The La source, the AE source, and the Mn source are prepared. Here, AE is at least one among Ca, Sr and Ba. Typically, $La_2O_3$ is prepared for La, $CaCO_3$ is prepared for Ca, $SrCO_3$ is prepared for Sr, and $BaCO_3$ is prepared for Ba.

Those sources are weighed and mixed at a ratio of providing a desired composition, and are then shaped into a desired form. An unfired bare body is thus obtained. Mixing and shaping methods are not limited to particular ones, and general methods used in producing ceramic bare bodies can be applied. For example, the unfired bare body may be formed by mixing the above-mentioned sources with a dispersant, a binder, etc. to obtain slurry, by shaping the slurry into green sheets with a doctor blade method or the like, and by laminating the green sheets one above another. As an alternative, the unfired bare body may be obtained by using a pressing method.

Then, the unfired bare body obtained as described above is fired into a sintered bare body. The firing may be performed in the atmosphere.

Conditions of the firing are not limited to particular ones, but the fining is preferably performed, for example, at temperature of not lower than 1250° C. and not higher than 1300° C. for a firing time of not shorter than 1 hour and not longer than 10 hours.

Then, a surface of the sintered bare body thus obtained is partly removed to provide the sintered bare body having a desired shape. A method of removing the surfaces is not limited to particular one, but polishing, particularly lapping, is preferably used.

Then, annealing is performed on the sintered bare body having been processed as described above. The annealing can change, to the monoclinic system, a crystal system in the surface that has been processed in the above surface removing step.

The annealing is performed in an oxygen atmosphere and preferably in the atmosphere.

The annealing is performed at temperature of not lower than 900° C. By performing the annealing at temperature of not lower than 900° C., the crystal system in the surface of the bare body can be changed to the monoclinic system.

Through the above steps, the bare body formed of the ceramic member according to the present disclosure can be obtained.

Stated in another way, the present disclosure provides a production method for a ceramic member made of a compound oxide of La, AE and Mn, the production method comprising steps of:

obtaining a sintered body by firing a La source, an AE source (where the AE source is (i) a Ca source, or (ii) a Ca source and at least one of a Sr source and a Ba source such that a total amount of Sr and Ba to a total of Ca, Sr and Ba is not more than 5 mol %), and a Mn source;

removing at least a part of a surface of the sintered body; and annealing the sintered body from which at least the part of the surface has been removed at 900° C. or higher under the presence of oxygen.

The electronic element according to the present disclosure can be obtained by forming a pair of electrodes on the surface of the bare body produced as described above.

A method of forming the electrodes is not limited to particular one, and a CVD method, electrolytic plating, electroless plating, vapor deposition, sputtering, baking of a conductive paste, or the like may be used. Preferably, the baking of the conductive paste is used.

The electronic element obtained as described above is excellent in electrical characteristics, particularly IV characteristics, because an ohmic junction is formed at the interface between each of the electrodes and the bare body.

EXAMPLE

The ceramic member and the electronic element according to the present disclosure will be described in more detail below in connection with EXAMPLE.

Sample Preparation

An inrush current suppression element was fabricated as follows.

Powder of manganese oxide ($Mn_3O_4$) and powder of calcium carbonate ($CaCO_3$), each powder being not less than 99.9%, were prepared as materials for a bare body. After firing those materials, they were weighed to obtain a composition expressed by the following formula.

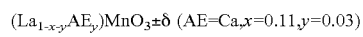

$(La_{1-x-y}AE_y)MnO_3 \pm \delta$ (AE=Ca, $x=0.11$, $y=0.03$)

The above materials for the bare body were put into a pot of 500 ml together with partially-stabilized zirconium oxide (PSZ) balls having a diameter of 2 mm, pure water, and a dispersant. They were then pulverized and mixed for 16 hours. Obtained slurry was dried, granulated, and calcined in the atmosphere at 900° C. for 4 hours. An organic solvent and a dispersant were added to powder obtained after the calcination, and resulting slurry was subjected to a pulverization and mixing process for 16 hours with the aid of the PSZ balls. After mixing a plasticizer and an organic binder, the processed slurry was further mixed for 6 hours, whereby slurry for forming sheets was prepared. The thus-prepared slurry was formed into a green sheet by a doctor blade method, and the green sheet was cut into strip-like sheets. A block (green body) was fabricated by laminating and pressure-bonding those strip-like sheets. The block was cut into individual pieces each of which would have size of about 10 mm×10 mm×1.5 mm after firing. Then, those block pieces were heated to 450° C. in the atmosphere for a debinding process and further fired at 1250 to 1300° C. for 4 hours in the atmosphere. A sintered body thus obtained was polished by lapping. Thereafter, annealing was performed on the sintered body by holding it at each of 700° C., 800° C., 900° C., 1000° C., 1100° C., 1200° C., and 1300° C. for 2 hours in the atmosphere. The bare body formed of the ceramic member was fabricated through the above-described process.

Then, electrodes were formed by applying an Ag paste to opposing principal surfaces of the bare body with screen printing, and by baking the Ag paste with heat treatment at 700° C. for 10 minutes. As a result, samples of an NTC element were obtained.

Separately, a sample of another NTC element was fabricated in a similar manner except for not performing the above-described annealing.

Evaluation

Evaluation of IV Characteristics

On each of the samples ($La_{0.86}Ca_{0.03}$)$MnO_3 \pm \delta$) fabricated as described above, electrical characteristics were evaluated as follows.

On the samples obtained as described above, IV characteristics were measured at a room temperature with a precision/measurement unit (Agilent B2911A), and the square of the correlation coefficient r was calculated. FIG. 1 and Table 1 indicate the calculation results.

It is preferable that the IV characteristics have linearity. As indicated in FIG. 1 and Table 1, however, it was confirmed, for the sample not subjected to the annealing, that the square of the correlation coefficient r significantly deviated from 1, namely that the IV characteristics were represented by a curve significantly deviating from a linear line. It was also confirmed, for the samples subjected to the annealing at 700° C. and 800° C., that the linearity was low. On the other hand, it was confirmed, for the samples subjected to the annealing at 900° C. or higher, that the square of the correlation coefficient r was 1.0000, namely that the linearity of the IV characteristics was recovered.

Crystal Structure Analysis

Figure 2:
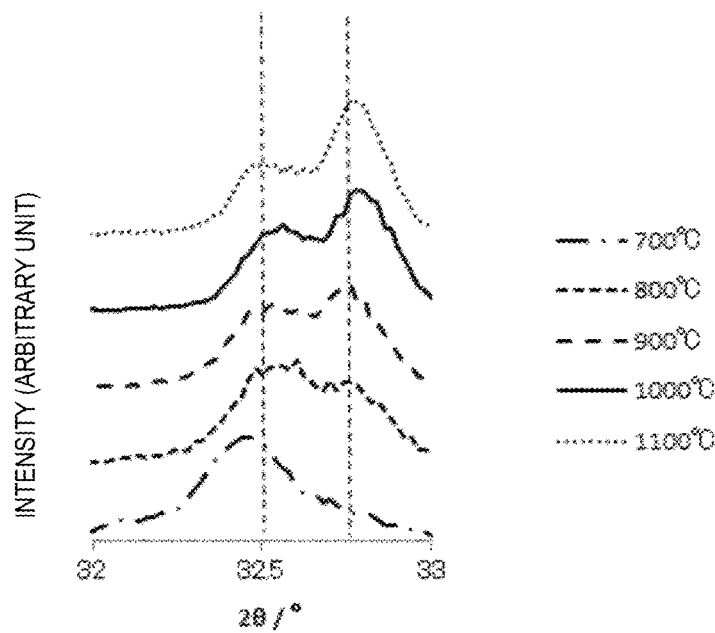
FIG. 2 plots XRD spectra of the samples according to EXAMPLE.

On the samples obtained as described above, crystal structures were analyzed with X-ray diffraction (XRD). FIG. 2 and Table 1 indicate the analysis results. The X-ray diffraction analysis was performed by using RINT-K (made by Rigaku Corporation). The CuK α-ray source was used as an X-ray source, and the measurement was made not on powder, but on the surface of the bare body.

As indicated in FIG. 2 and Table 1, it was confirmed that, by performing the heat treatment at high temperature, an observed peak changed from a single peak (orthorhombic crystal) to a double peak (monoclinic crystal) over a range of $2\theta=32°$ to 33° in the surface of the bare body. It was also confirmed that the peak intensity on the wider angle side relatively increased with the heat treatment performed at higher temperature.

Furthermore, the ratio (I1/I2) of the first peak intensity I1 appearing near $2\theta=32.5°$ to the second peak intensity I2 appearing near $2\theta=32.7°$ was measured. Table 1 indicates the measurement results.

As indicated in Table 1, the I1/I2 ratio increases with the heat treatment performed at higher temperature.

B-Constant

The B-constant was measured for evaluation of the NTC characteristics. The B-constant was obtained by measuring resistance in a liquid phase with a nano-voltmeter (Agilent 34420A), and by calculating B-constant values based on the following formula. Table 1 indicates the measurement results. Measurement temperatures were set to 25° C. and 100° C., and the temperature was controlled to fall within a range of ±0.1° C. relative to the setting temperature during the measurement.

$$B=\ln(R100/R25)/(1/(273.15+100)-1/(273.15+25)$$

[R100: element resistance at 100° C., and R25: element resistance at 25° C.]

From the viewpoint of the NTC characteristics, the B-constant is desired to be high. It was confirmed that all of the samples subjected to the annealing at 900° C. or higher had the B-constants as high as over 2000K.

TABLE 1

| Sample No. | Annealing Temperature | Square of Correlation Coefficient r of IV Characteristics | X-ray Peak Ratio I1/I2 | B-constant |
|---|---|---|---|---|
| 1 | 700° C. | 0.9916 | 0.33 | 2085K |
| 2 | 800° C. | 0.9911 | 0.82 | 1973K |
| 3 | 900° C. | 0.9994 | 1.11 | 2225K |
| 4 | 1000° C. | 0.9999 | 1.40 | 2327K |
| 5 | 1100° C. | 1.0000 | 2.06 | 2416K |
| 6 | 1200° C. | 1.0000 | 2.21 | 2505K |
| 7 | 1300° C. | 1.0000 | 2.28 | 2505K |

The ceramic material according to the present invention can be utilized as a material used to form an inrush-current suppression thermistor element, but application fields are not limited to such an example.

The invention claimed is:

1. A ceramic member comprising a compound oxide of La, AE and Mn, wherein:
   AE is (i) Ca, or (ii) contains Ca and at least one of Sr and Ba with a total amount of Sr and Ba to a total of Ca, Sr and Ba of not more than 5 mol %, and
   a crystal system in a surface of the ceramic member is a monoclinic system.

2. The ceramic member according to claim 1, wherein the compound oxide has a composition expressed by:

$$La_{1-x-y}AE_yMnO_3$$ 

wherein
   x is 0<x≤0.20, and
   y is 0<y≤0.10.

3. The ceramic member according to claim 1, wherein
   a total of molar parts of the La and molar parts of the AE is 80 to less than 100 molar parts with respect to 100 molar parts of the Mn, and
   the molar parts of the AE are more than 0 molar part to not more than 10 molar parts with respect to 100 molar parts of the Mn.

4. The ceramic member according to claim 1, wherein the crystal system in the surface of the ceramic member is different from a crystal system in a middle portion of the ceramic member.

5. The ceramic member according to claim 4, wherein the crystal system in the surface is a monoclinic system, and the crystal system in the middle portion is an orthorhombic system.

6. The ceramic member according to claim 1, wherein the ceramic member is a bare body of an electronic component.

7. An electronic element comprising:
the ceramic member according to claim 6; and
an electrode on a surface of the bare body.

8. The electronic element according to claim 7, wherein a square of a correlation coefficient r of current-voltage characteristics is not less than 0.9995.

9. The electronic element according to claim 7, wherein the electronic element is a thermistor element constructed to suppress an inrush current.

10. A ceramic member comprising a compound oxide of La, AE and Mn, wherein:
AE is (i) Ca, or (ii) contains Ca and at least one of Sr and Ba with a total amount of Sr and Ba to a total of Ca, Sr and Ba of not more than 5 mol %, and
the ceramic member has peak intensities at $2\theta=32.5°$ and $32.7°$ in an X-ray diffraction analysis using a CuK $\alpha$-ray source.

11. The ceramic member according to claim 10, wherein the compound oxide has a composition expressed by:

$$La_{1-x-y}AE_yMnO_3$$

wherein
x is $0<x\leq0.20$, and
y is $0<y\leq0.10$.

12. The ceramic member according to claim 11, wherein
a total of molar parts of the La and molar parts of the AE is 80 to less than 100 molar parts with respect to 100 molar parts of the Mn, and
the molar parts of the AE are more than 0 molar part to not more than 10 molar parts with respect to 100 molar parts of the Mn.

13. The ceramic member according to claim 10, wherein a ratio of the peak intensity at $2\theta=32.7°$ to the peak intensity at $2\theta=32.5°$ is larger than 1.

14. The ceramic member according to claim 10, wherein a crystal system in a surface of the ceramic member is different from a crystal system in a middle portion of the ceramic member.

15. The ceramic member according to claim 14, wherein the crystal system in the surface is a monoclinic system, and the crystal system in the middle portion is an orthorhombic system.

16. The ceramic member according to claim 10, wherein the ceramic member is a bare body of an electronic component.

17. An electronic element comprising:
the ceramic member according to claim 16; and
an electrode on a surface of the bare body.

18. The electronic element according to claim 17, wherein a square of a correlation coefficient r of current-voltage characteristics is not less than 0.9995.

19. The electronic element according to claim 17, wherein the electronic element is a thermistor element constructed to suppress an inrush current.

20. A production method for a ceramic member made of a compound oxide of La, AE and Mn, where AE is (i) Ca or (ii) contains Ca and at least one of Sr and Ba with a total amount of Sr and Ba to a total of Ca, Sr and Ba of not more than 5 mol %, the production method comprising:
obtaining a sintered body by firing a La source, an AE source, and a Mn source;
removing at least a part of a surface of the sintered body; and
annealing the sintered body from which at least the part of the surface has been removed at 900° C. or higher under the presence of oxygen,
where the AE source is (i) a Ca source, or (ii) a Ca source and at least one of a Sr source and a Ba source.

* * * * *